US006864802B2

(12) United States Patent
Smith et al.

(10) Patent No.: US 6,864,802 B2
(45) Date of Patent: Mar. 8, 2005

(54) WIRELESS SPREAD-SPECTRUM TELESENSOR CHIP WITH SYNCHRONOUS DIGITAL ARCHITECTURE

(75) Inventors: Stephen F. Smith, Loudon, TN (US); Gary W. Turner, Clinton, TN (US); Alan L. Wintenberg, Knoxville, TN (US); Michael Steven Emery, Powell, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 728 days.

(21) Appl. No.: 09/942,308

(22) Filed: Aug. 29, 2001

(65) Prior Publication Data

US 2002/0075163 A1 Jun. 20, 2002

Related U.S. Application Data

(63) Continuation-in-part of application No. 09/653,394, filed on Sep. 1, 2000.

(51) Int. Cl.$^7$ ............................................. G08C 19/22
(52) U.S. Cl. .................. 340/870.07; 257/678; 257/924; 361/820
(58) Field of Search ..................... 340/870.07; 257/678, 257/924; 361/820

(56) References Cited

U.S. PATENT DOCUMENTS

| 3,972,237 | A | | 8/1976 | Turner | |
|---|---|---|---|---|---|
| 3,978,471 | A | | 8/1976 | Kelly | |
| 4,644,481 | A | | 2/1987 | Wada | |
| 4,783,799 | A | * | 11/1988 | Maass | ........................ 380/43 |
| 4,916,643 | A | | 4/1990 | Ziegler et al. | |
| 5,169,234 | A | | 12/1992 | Bohm | |
| 5,326,173 | A | | 7/1994 | Evans et al. | |
| 5,388,126 | A | * | 2/1995 | Rypinski et al. | ............ 375/364 |
| 5,483,827 | A | | 1/1996 | Kulka et al. | ............... 73/146.5 |
| 5,735,604 | A | | 4/1998 | Ewals et al. | |
| 5,795,068 | A | | 8/1998 | Conn, Jr. | |
| 5,838,741 | A | | 11/1998 | Callaway, Jr. | |
| 5,892,448 | A | | 4/1999 | Fujikawa et al. | |
| 5,914,980 | A | | 6/1999 | Yokota et al. | |
| 5,998,858 | A | * | 12/1999 | Little et al. | ................. 257/678 |

FOREIGN PATENT DOCUMENTS

EP 0 74 4 627 A1 11/1996

OTHER PUBLICATIONS

International Search Report re PCT/US01/26985 dated Apr. 5, 2002.
XP000695232 Lipman, "Growing Your Own IC Clock Tree", Electrical Design News, vol. 6, 8 pages.
Robert C. Dixon, Spread Spectrum Systems with Commercial Applications, 3$^{rd}$ Edition, John Wiley and Sons, Inc., 1994, pp. 55–58.

* cited by examiner

Primary Examiner—Timothy Edwards
(74) Attorney, Agent, or Firm—John Bruckner PC

(57) ABSTRACT

A fully integrated wireless spread-spectrum sensor incorporating all elements of an "intelligent" sensor on a single circuit chip is capable of telemetering data to a receiver. Synchronous control of all elements of the chip provides low-cost, low-noise, and highly robust data transmission, in turn enabling the use of low-cost monolithic receivers.

56 Claims, 10 Drawing Sheets

WIRELESS SPREAD-SPECTRUM TELESENSOR CHIP WITH SYNCHRONOUS DIGITAL ARCHITECTURE

CROSS-REFERENCE TO RELATED APPLICATIONS

This application claims a benefit of priority under 35 U.S.C. §120 from, and is a continuation-in-part of, U.S. patent application Ser. No. 09/653,394 filed 1 Sep. 2000 (effective filing date Dec. 18, 2000).

This application is related to U.S. patent applications Ser. No. 09/653,788, filed 1 Sep. 2000 and Ser. No. 09/660,743, filed Sep. 13, 2000, commonly owned.

STATEMENT OF GOVERNMENT RIGHTS

The United States Government has rights in this invention pursuant to Contract No. DE-AC05-00OR22725 between the United States Department of Energy and UT-Battelle, LLC.

FIELD OF THE INVENTION

This invention relates to the field of data transmission in digital format from a sensor, and more particularly to the use of a fully integrated, monolithic telemetry circuit chip using a fully synchronous architecture.

BACKGROUND OF THE INVENTION

1. Technical Background of the Invention

Telemetry, in a simplified definition, is the process of sensing data and then transmitting this data to a remote location, usually by a wireless means such as radio. Such devices can be used in applications ranging from industrial process monitoring, environmental/pollution sensing, fire and security alarms, emergency operations, equipment condition monitoring and diagnostics, automotive/vehicular controls, building energy monitoring and control systems, medical/veterinary instrumentation, and in military/battlefield sensing tasks. These remote devices usually perform additional functions as needed, such as conditioning, averaging, or filtering the data or storing it prior to transmission. Currently, these remote transmitter (or transceiver) devices are typically circuit-board based, multi-component assemblies constructed from several independently manufactured chip units. Even in relatively simple transmitter devices, many different functions must be accomplished by units or subsets of the circuitry carried by the devices. In a telemetry device for collecting and transmitting sensor data such as temperature, for example, there are required multiple circuit functions, typically including: a data-acquisition or measurement device in the form of the temperature sensor to detect temperature and provide an analog signal indicative of the sensed temperature; a converter to convert analog data to a digital format; a memory for storing the data; mixing devices to modulate the data onto a carrier such as a radio-frequency wave; and a transmitter. Other types of sensing circuits or functions useful for such applications include optical sensors, flow sensors, humidity sensors, chemical sensors, biochemical sensors, electrical current sensors, electrical voltage sensors, magnetic-field sensors, electric-field sensors, mechanical force sensors, acceleration sensors, velocity sensors, displacement sensors, position sensors, vibration sensors, acoustic sensors, radiation sensors, electrical-charge sensors, viscosity sensors, density sensors, electrical resistance sensors, electrical impedance sensors, electrical capacitance sensors, electrical inductance sensors and mechanical pressure sensors. These sensor types may be primarily electrical in nature (e.g., bridge circuits), electromechanical ("MEMS") with electronic or piezoelectric readouts, optical (e.g., a photodiode or phototransistor), a purely piezoelectric, piezoresisitive, or magnetoresistive transducer device, or some combination thereof. Ideally, these sensor devices would be integrated into the same integrated-circuit chip, although in practical implementations this is sometimes not currently feasible due to incompatibilities between the processes used to manufacture the sensors (such as MEMS devices) and the standard silicon electronic circuits, particularly modem mixed-signal (analog plus digital) CMOS [complementary metal-oxide semiconductor], as used in the prototypical telesensor chip described herein. In the cases where the sensor must be separate from the main telesensor system chip, the main chip can still provide amplification, filtering, and other signal conditioning for the signals from off-chip sensors feeding the external input(s) of the main device.

The overall functionality of these telemetry devices is severely hampered by the size and the complicated architecture and inter-chip connections inherent in a multi-chip device. The relatively large size of these devices markedly limits the useful locations thereof. In addition, these devices have relatively high power requirements. It is known in the art, for example, that the chip-to-chip signal transmission in such devices alone creates a high power demand in addition to the power needed to operate or drive each of the individual subcomponents on each chip. An additional constraint involves overall power consumption; since many remotely located telemetry systems are battery-operated or powered by low-energy sources such as solar cells, it is vital that the system perform its measurement and reporting tasks with as little average power as possible. Further, since most small power sources are significantly limited in their ability to provide large peak current levels, it is also important that the device control its maximum transient power requirements as well.

Current technology makes attempting to decrease the size and power requirements of telemetry devices, such as by placing all of the system subcomponents on a single chip, difficult or impractical for multiple reasons.

The operations of these different units, and operations incident to the function of the units, usually require or at least reference a timing or clock signal. As is well known in the art, clock signals are used for such operations as controlling the timing of a switch between a high logic state ("on") and a low logic state ("off") for a particular unit, for controlling the placement of digital bits within a transmitted stream, and other functions where actions must be coordinated. In a digital transmitter device, some of the required parameters are the frequency of the radio wave (RF) carrier, the baud (data-transmission bit) rate, the data-burst timing, and the data interface rates (e.g., the input speed of serial data). Each of these operations, among others, require a frequency reference source, or clock, for reference and control. Clock signals can be generated by crystal oscillators, SAW (surface acoustic wave) devices, and other oscillation sources are known to the art.

In a data acquisition system, such as a data-acquisition and transmission telemetry device, additional functions are executed. These include conversion of acquired data from analog to digital form where necessary, the writing to and reading from storage or memory of such data, and the provision of instructions creating and controlling the desired cycle of operation. These functions also require or use as a reference a clock signal.

It remains the current practice in designing and creating transmitters and telemetry devices to use separate oscillators, such as the crystals referenced above, to provide the oscillation signal for one, or only a few, clocks, or frequency-reference sources, for separate units and/or functions. Setting center frequencies for RF carriers, determining channel step sizes, and controlling embedded processors and controllers are some examples of operations that almost invariably are controlled by separate clocks. In addition, any other specialized functions or devices incorporated in a digital telemetry device will be provided with additional, separate clocks, even where use is made of frequency synthesis, that is, the multiplication or division of a single clock frequency to provide more than one clock reference.

Even the simplest telemetry device in the art today therefore has several relatively unrelated clocks and thus several relatively unrelated ("asynchronous") frequencies in the circuits. The frequencies interfere with each, creating "beats" which can in turn contribute more interference. "Beats", a form of interference, are periodic variations resulting from the superposition of waves having different frequencies and often occur in devices using multiple functional clock signals. The more complicated the device, the more functional clocks are needed, and thus the more complicated and noisy the interference becomes. Especially as devices become both more complicated and smaller, further problems are caused by the cross-coupling of clock signals through capacitive or radiating means. This is of particular concern when the cross-coupling occurs in low-level signal units and units such as synthesizer loop-control lines and modulation signal wiring. More specifically, both complex and small single-chip devices tend to be implemented in modem, very small-geometry monolithic fabrication processes. The extreme proximity of the various signal-transmission lines on the tiny substrates used for single-chip devices only exacerbates the problems of capacitive, inductive and radiative coupling of the multiple unrelated high-speed RF-type clock signals onboard the chip. Interference imposed on these units can mask or interfere with data signals and even create spurious or faulty RF transmissions.

The use of separate clocks is also inherently problematic for other reasons. Having several clocks requires additional circuitry to generate the clock signals, takes up room that could be used for other devices, and is more expensive in terms of both design and manufacture. These problems increase proportionately as techniques improve to reduce the size while increasing the utility of telemetry devices. These problems are markedly exacerbated when the device incorporates on-chip receiver circuitry, either RF or optical, for controlling device parameters or operational functions.

Multiple clock signals cause problems outside the device as well. The more complicated the telemetry transmitter is, the more complicated the receiver must be. The use of multiple clock sources on the transmitter can cause noise that must be internally filtered within the chip. Wireless spread-spectrum transmissions are often embedded in Gaussian (random) channel noise, and spurious transmitted noise components further hinder system performance. Also, receiver acquisition and lock-up times will be longer than optimum (if only to ensure that the lock-up is correct despite the signal's embedded noise) and will thereby reduce the data throughput of the RF link. In addition, a noisier system typically requires higher transmitter and receiver power to ensure that the data signals of interest can be detected above the normal levels of RF channel noise. Finally, high levels of internally generated noise or spurious components in the transmitted signals can ultimately limit the minimum data error rates achievable by the overall telemetry system.

Current construction of these devices also recognizes problems associated with the transmitter. The transmitter typically requires substantially more power than the other sub-units of the telemetry device, and continuous transmission constitutes a significant portion of the total power requirement for these devices. When the transmitter is housed in close proximity to the sensing unit of the device, the strong RF signal produced interferes with the sensor's ability to acquire data, limiting the device's overall utility and sensitivity. Similar types of interference also affect adversely RF, optical, or other types of RF receiving circuitry which also may be present within the device. Further, the heat generated by the on-chip transmitter stages can also adversely affect other, temperature-sensitive parts of the circuitry; in the version of the instant invention which includes an on-chip temperature sensor, its readings will be shifted upward by the transmitter heating, thus causing errors in measuring the ambient temperature.

2. Description of Related Art

A review of several patents in the existing art confirms the deficiency of current designs in failing to provide a fully synchronous RF transmitting architecture capable of being manufactured as a single-chip device. For example, U.S. Pat. No. 4,916,643, issued Apr. 10, 1990 to Ziegler et al., discloses a remote temperature-sensing and signal-multiplexing scheme that utilizes a combination of a primary pulse-interval modulation and a secondary pulse-amplitude or pulse-width modulation transmission technique. The application is to combine several sensor-data channels over existing wire busses via time multiplexing; the secondary pulse-amplitude and/or pulse-width modulations simply represent the analog values of the respective sensor data streams. The system does not employ any type of RF or spread-spectrum data transmission and does not in any way embody an RF data link.

U.S. Pat. No. 3,978,471, issued Aug. 31, 1976 to Kelly, discloses a drift-compensated digital thermometer circuit which employs a temperature-sensitive resistor in a standard analog bridge circuit, which in turn is read out by a common dual-slope analog-to-digital (A/D) converter. The local voltage reference source is used to drive the A/D on alternate cycles between the temperature conversions, and thus compensate for any drifts in the reference voltage. This feature obviates the need for a precision, highly stable reference voltage source in the system. This patent has no provisions for data transmission or spread-spectrum coding; thus it fails to address the subject areas of the instant application.

U.S. Pat. No. 3,972,237, issued Aug. 3, 1976 to Turner, discloses an electronic thermometer system consisting of: a thermistor to measure the desired point temperature; front-end analog pre-amplifier; a voltage-to-frequency converter which generates digital output pulses at a rate determined by the magnitude of the analog input voltage from the temperature measurement; and a counter to accumulate the pulses in a given time interval and display the result digitally. As with the '471 patent above, this device has no means of transmitting its data to a remote location and lacks most of the other attributes of the present invention.

U.S. Pat. No. 4,644,481, issued Feb. 17, 1987 to Wada, describes another electronic thermometer system, consisting of: an oscillator whose frequency is determined by a temperature-sensitive resistor; a counter to accumulate the oscillator output pulses during a predetermined time interval; a timer to generate said interval; a memory to store said temperature data; and a calculator circuit to compute changes in the temperature data and track trends therein. As in the previous patents, no means of transmitting data or developing spread-spectrum modulation is included; further, no clock-synchronization circuitry is evident.

U.S. Pat. No. 5,169,234, issued Dec. 8, 1992 to Bohm, discloses an infrared (IR) temperature sensor with an non-contacting infrared-emissivity measurement device, coupled to a local temperature-compensating element; an analog front-end amplifier; a voltage-to-frequency (V/F) type of A/D converter to digitize the IR sensor reading; a second A/D converter to digitize the local reference-junction device to compensate for the local temperature of the IR detector; a microprocessor to combine the various readings and apply nonlinear corrections as needed to the IR emission measurement to provide an accurate temperature therefrom; a user interface and display; and coupling means to interface to an external two-wire bus. Although this device incorporates several of the data-acquisition features of the instant system, it nevertheless is greatly diverse for the following reasons: it lacks the intrinsic RF transmitting and spread-spectrum encoding functions; it is a multi-component (board-level) system rather than a single chip; it contains a general-purpose microprocessor rather than a customized digital state-machine controller; it lacks the synchronous inter-coordination between data-acquisition and transmission functions; and it consumes far more power than the present invention.

U.S. Pat. No. 5,326,173, issued Jul. 5, 1994 to Evans et al., discloses a technique plus apparatus for improved accuracy of optical IR pyrometry (non-contacting emissivity measurements). The accuracy in remote measurement of temperatures of a specific surface is improved over standard IR techniques by mounting the IR sensor in an integrating cavity and then exposing the target to IR radiation from two or more distinct sources (ideally but not necessarily at different wavelengths). The multiple beams reflect from the target surface at different angles; measurements of the multiple reflected signals can compensate for anisotropy of the target surface and can thus separate the reflected and truly temperature-related emitted components at the detector(s). Although the method is a clear improvement in the remote IR pyrometry art, it does not relate to the instant device, which incorporates a contact-type thermal sensor only.

U.S. Pat. No. 5,735,604, issued Apr. 7, 1998 to Ewals et al. discloses a novel method and apparatus for the contact-less determination of the temperature of an object or at least part of an object, generally applied in equipment monitoring to measuring the temperature of a heated roller or endless belt, as in image copying machines and printers. The sensor unit is placed near the object to be measured and consists of two plates, each of which is equipped with a temperature sensor. A control unit takes the two plate-temperature signals and via a predictive Kalman digital filter estimates the temperature of the target object. The estimation process is achieved by utilizing both commomalities and differences in the two plate temperature trends to mathematically model the thermodynamic relationships between the target and the two plates. The models are then used to infer the temperature of the target object. No data formatting or transmission circuitry whatever is disclosed. Although a useful development in the general thermometry art, this patent has no specific bearing on the instant application.

U.S. Pat. No. 5,795,068, issued Aug. 18, 1998 to Conn, Jr., discloses a method for measuring localized operating temperatures and voltages on an integrated-circuit (IC) chip. The device includes a "ring"-type logic-gate oscillator circuit that varies with temperature and/or applied voltage. The frequency of the oscillator is then determined for a number of temperatures to establish a known frequency-versus-temperature (or voltage) response characteristic. A second, identical oscillator circuit is included on the chip. The characteristic of the first oscillator is then used to back-calculate the temperature and/or voltage of the second circuit. The basic monolithic temperature-measuring circuits are already well known in the art. Further, no specific means of telemetering the data off-chip is disclosed. The dual-oscillator technique is useful for detailed production testing of large numbers of IC logic chips, but has no overlap with the instant application.

U.S. Pat. No. 5,892,448, issued Apr. 6, 1999 to Fujikawa et al. discloses an electronic clinical thermometer unit consisting of: a thermal-sensing oscillator; a reference oscillator for control timing; a counter to store the temperature-related frequency value; memory to store successive measurements over a predetermined period; a rate detector circuit to assess if the reading is not sufficiently stable for display; a hold circuit to latch the highest reading in a sequence; and a digital visual temperature display. The logic filters the sensor readings to assure that the thermometer has adequately tight and stable contact with the patient's body to generate a clinically accurate reading. This oscillator-type thermometer operates in a different manner to the analog sensors onboard the device of the instant invention; further, the self-contained unit in '448 has no provisions for formatting, encoding, or wireless telemetry of the temperature data to an external receiver.

U.S. Pat. No. 5,914,980, issued Jun. 22, 1999 to Yokota et al. disclose a wireless spread-spectrum communication system optimized for use in batteryless "smart" cards and complementary reader/writer units to read, transfer, and store data on the card for commercial and financial applications. Spread-spectrum wireless signals are used to provide improved robustness and data reliability in typical transactions, as well as to power the small card through an onboard RF pickup coil. The fixed reader/writer unit contains a low-power transmitter operating in the vicinity of 200 kHz into a coil antenna to couple the required RF energy into the card. The single-chip card circuitry, via a standard phase-locked loop (PLL), multiplies this power-signal frequency up to roughly 4 MHz to operate onboard microprocessor, logic, memory, and data-transmitter clocks. The return spread-spectrum data link also operates at 4 MHz to send stored information back to the reader/power unit. Although several elements of the instant invention are utilized in the system of '980, the application is profoundly different. In '980, there are no sensors, no digitizer functions, and no data-acquisition or processing features. Further, the '980 devices have only a small number of possible spreading codes and no real power-management capability (i.e., programmable power-cycle times). No attempt has been made optimize the RF link data rate, spreading rate, burst times relative to standard RF data channels (i.e., with typical impairments such as interference, noise, multipath) due to the stated close proximity of the two units (card and reader) in their intended application. The instant device, in contrast, is designed to operate at much higher frequencies useful for longer range communications (typically tens of meters to kilometers).

Finally, U.S. Pat. No. 5,838,741, issued Nov. 17, 1998 to Edgar Callaway, Jr. et al. discloses a scheme that ensures that digital data in an RF receiver is transferred to downstream stages only at times which will have minimal impact on the front-end and other more sensitive parts of the circuit. The scheme is generally applicable to miniature units and particularly relevant to single-chip (monolithic) devices. The salient goal is to minimize on-chip data transfers (with their inherent noise) during any critical signal-sampling instants, delaying them to less sensitive times. The system controller can be configured to insert an optimum delay into the various subsystem control lines to avoid logic transitions at noise-critical times for the various circuits. Although the techniques therein are useful for the manufacture of receiver hardware, they only deal with noise generated internal to a receiver and do not in any way address noise and degradations affecting the output signal from a wireless (RF) transmitter. Further, they do not recognize the benefits of completely synchronous (and thus fully deterministic) system operation, but rather only deal with the judicious insertion of logic delays to minimize the undesired time-sensitive signal crosstalk and other interactions.

Therefore, there abides a need in the art for devices and methods that overcome the problems currently being experienced and capitalize on the advantages inherent in a single chip telemetry device.

SUMMARY OF THE INVENTION

It is an object of this invention to provide a telemetry apparatus and method utilizing fully synchronous control of system operations.

It is also an object of this invention to provide a digital telemetry device having reduced noise levels and lower power requirements.

It is a further object of this invention to provide a method of transmitting sensor data in a spread-spectrum mode with higher accuracy due to a single-clock system design.

It is another object of this invention to enable the operation of circuitry in a sensor telemetry device with the use of a single primary frequency reference source.

It is an additional object of this invention to lower the cost of sensor telemetry devices by enabling the use of simpler, low-power designs, the components of which are required to execute fewer and simpler operations.

It is yet another object of this invention to enable the use of a simpler and less expensive transmitter-receiver system made possible by low power requirements, high data accuracy, reliable data burst acquisitions, and faster signal acquisition and lock-up times, which are in turn made possible by the use of synchronous digital architecture.

It is still another object of the invention to permit the coexistence of sensitive sensor and analog front-end amplification and signal-processing circuitry with an RF transmitter on the same chip by achieving time-multiplexing of mutually interfering portions of the system so that the interference sources are powered off or otherwise inactivated when the sensitive front-end circuitry is active. Conversely, the front end is disabled (powered off and perhaps even clamped) when the transmitter and other RF circuitry is active to avoid damage to sensitive circuits from the relatively high RF signal levels on-chip.

These and other objects are achieved by the current invention, which provides a monolithic data acquisition and transmission telemetry apparatus having a resident sensor generating resident sensor data; an external sensor input connector transmitting external sensor data; sequence controller circuitry; spread-spectrum data circuitry; a single clock signal generator; and a transmitter; wherein said resident sensor, said external sensor input connector, said sequence controller circuitry, said spread-spectrum data circuitry, said single clock signal generator, and said transmitter are each operatively connected such that said resident sensor data and said external sensor data can be transmitted by said transmitter; and wherein the operations of said sequence controller circuitry, said spread-spectrum data circuitry, and said transmitter are synchronously controlled by signals from said single clock signal generator. Optionally, a control receiver to permit remote control of the device may also be incorporated. A novel method of telemetering data by utilizing a fully synchronous digital architecture is likewise provided.

DETAILED DESCRIPTION OF THE INVENTION

Figure 1:
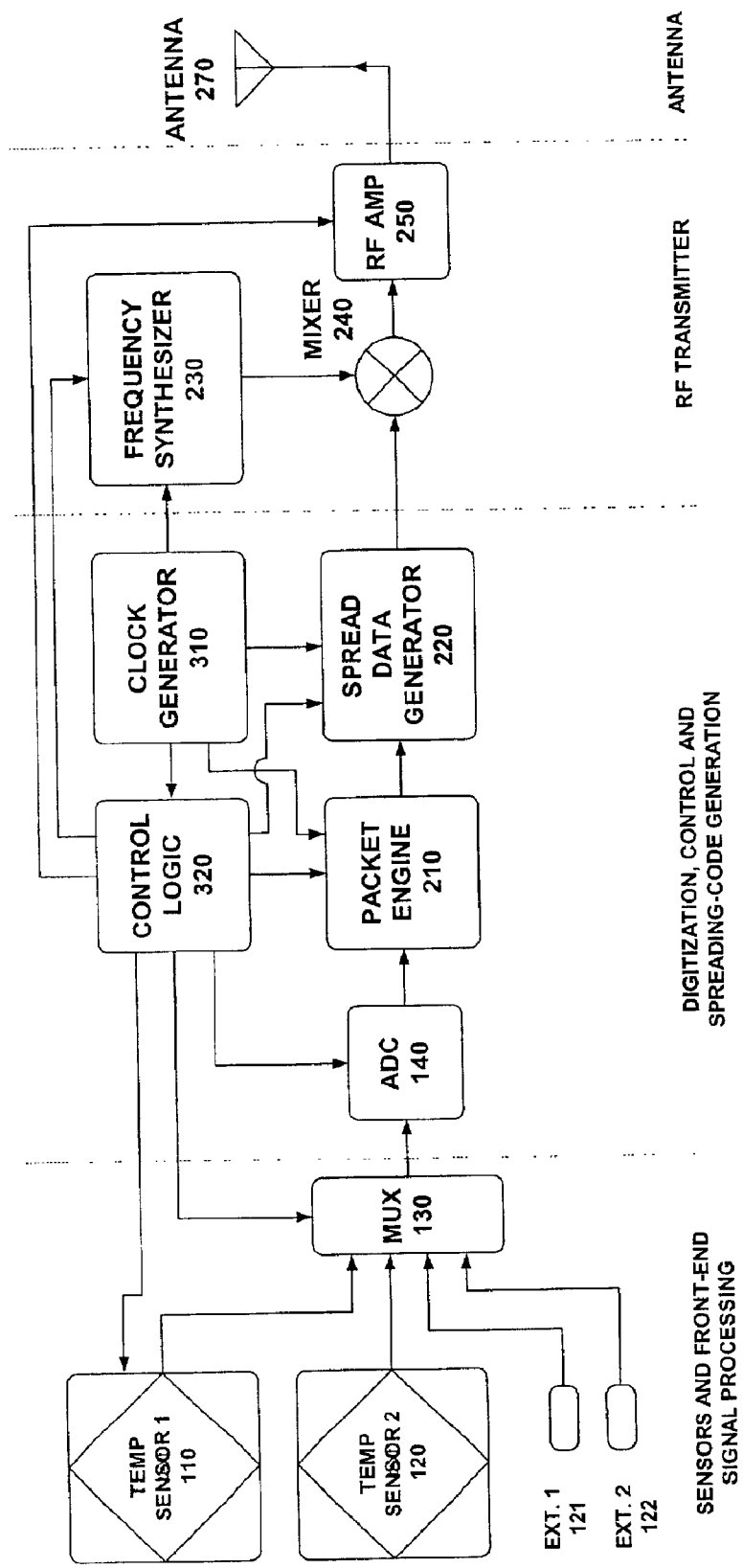
FIG. 1 shows the basic components of the invention in a block diagram format.

FIG. 1 represents the basic signal-flow block diagram of an exemplary application-specific integrated circuit (ASIC). (In describing the core components of the telemetry device, certain routine operations such as the amplification of signals, the provision of power, and the conditioning and/or filtering of signals, for example, which are well known to those of skill in the art, will not be explicitly described.)

A typical telemetry ASIC according to the invention maybe a temperature sensor for a particular device, the temperature of which is monitored at a remote location. The temperature data must be collected and encoded into a format usable by the receiver to which the data will be sent. The encoded data stream is then mixed (modulated) with spread-spectrum chipping data and superimposed onto an RF carrier wave for actual transmission.

The telemetry ASIC or other telemetry device is monolithic, that is, contained all on a single base or substrate such as a silicon chip. In large volumes, this approach permits less expensive final-product design and manufacturing, as well as permitting modular replacement where necessary. In the figure, those components to the left of the "Antenna" subsection are all intended to be mounted on, or made integral with, a single monolithic substrate or base.

In FIG. 1 are shown two sensors residing on the chip itself, referred to here as resident sensors. Each of these could be, for example, a wide-range (for industrial applications) or a more limited-range (for monitoring of mammals, including humans) electronic thermometer used to determine the local temperature of the substrate or a device therein. Resident sensor 110 and resident sensor 120 generate resident sensor data indicating the temperature at the respective locations thereof. The data from the resident sensors is conveyed to a multiplexer 130. Multiplexer 130 also has input connections such that external sensor data from one or more external sensors or signal sources 121,122 can be conveyed to multiplexer 130.

The resident sensor data and external sensor data from multiplexer 130 is then sent to an analog-to-digital converter (ADC) 140. ADC 140 converts the data from the resident and external sensors to a corresponding digital data stream which is sent or "written" to a register in the "Packet Engine" block 210. This group of logic devices arranges and assembles (encodes) the bits in the actual transmitted data packets (bursts) according to instructions from the main system "Control Logic" block 320. The function of the encoder within 210 is to condition the data into a format required by the particular receiver apparatus (not shown) in use with the ASIC of the invention. An example of such a receiving apparatus is that found in U.S. patent application Ser. No. 09/653,788. The type of encoding and the process therefore depends on the type of receiver and the demands of the system, all of which can be easily ascertained by those of skill in the art.

When an appropriate signal is received by the encoder, the encoded data is conveyed to the circuitry necessary to implement the spread-spectrum data to be used to transmit the data. To take advantage of spread-spectrum transmission technology, the transmitted data is also combined with the spread-spectrum data "chipping" sequence prior to transmission.

The direct-sequence spread-spectrum technique involves the use of polynomials to generate a code with which data, such as sensor data, is logically combined for transmission. The exemplary design is based on the assumption of a repeating code. The necessary polynomials for use in the claimed invention are created within the "Spread Data Generator" block 220. In a preferred embodiment, the initial settings for the polynomials, as discussed below, can be either mechanically hard-wired to logic "high or "low" levels or can be determined by external parameters from an external parameter setter. Spread Data Generator 220 thus produces a polynomial pseudorandom "pseudo-noise" (PN) code, although in a preferred embodiment spread-data generator 220 can utilize an internally generated PN code from one of several various well known algorithms, including maximal-length sequence (MLS) codes, Gold codes, or Kasami codes, or optionally a PN code transmitted from an external source (not shown).

The Spread Data Generator 220 combines the PN code with the formatted sensor data from Packet Engine 210. The serial spread-data stream thus produced is then conveyed to an upconverting frequency mixer 240. Mixer 240 combines the spread generator data from 220 with an RF carrier wave generated by a Frequency Synthesizer 230 to create a spread-data modulated RF signal. The RF signal is then sent to a final RF power amplifier 250, and thence to antenna 270 for transmission to a remote receiver. The other core components of the current invention are also shown in FIG. 1 and are further explained below. The telemetry apparatus also comprises a block of control logic 320, implemented as a synchronous state machine, to control and sequence the various operations and modes of the telemetry device. A clock-signal generator ("clock") 310 is also needed to provide timing signals to the other blocks as described below. State machine 320 and clock 310 are operatively connected to the other components of the invention as shown, intended to indicate the interconnections between the various components of the device.

Figure 2:
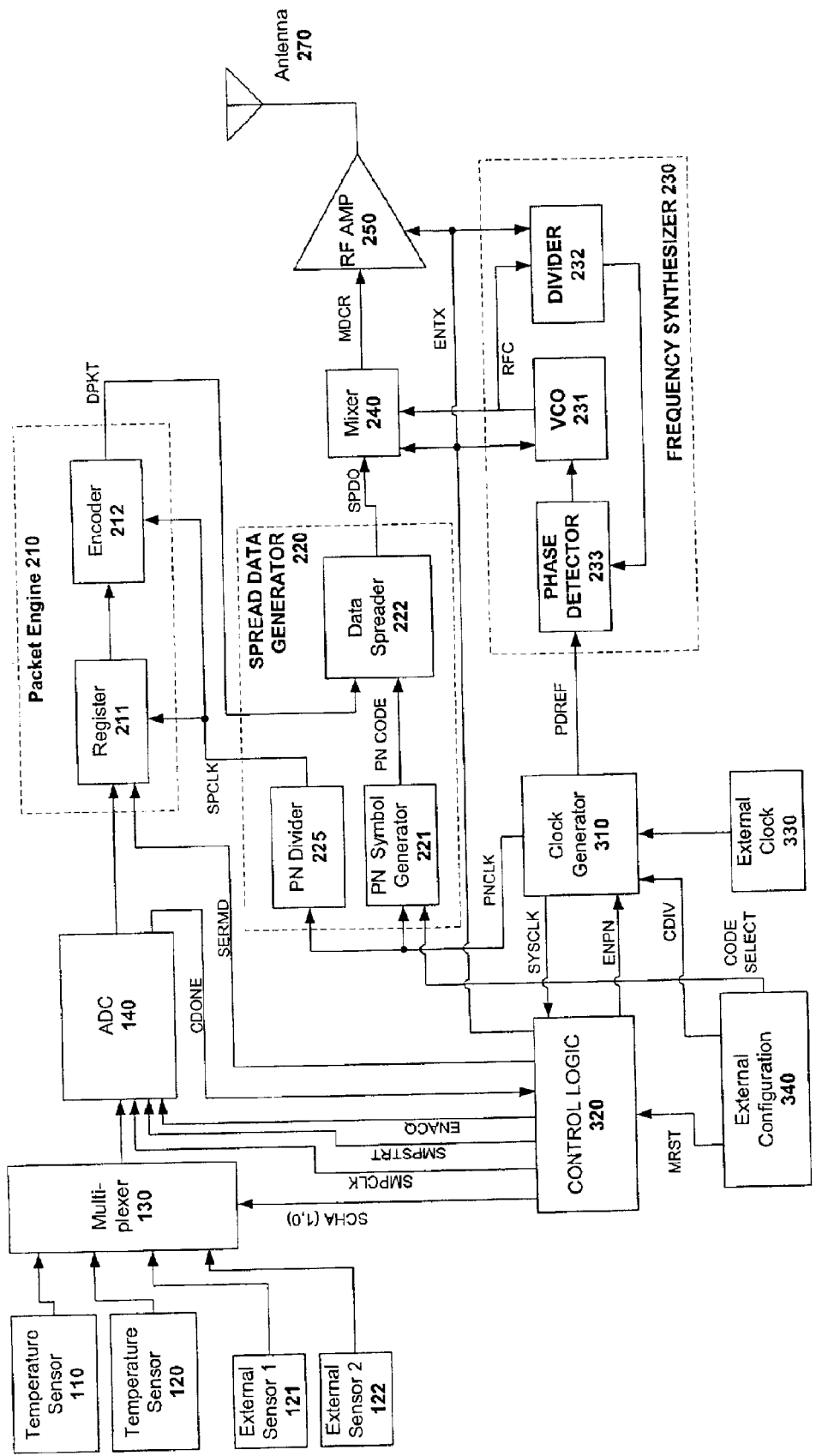
FIG. 2 provides a detailed functional block diagram of the invention, including the key subsystems therein.

Having described the basic subsystem-level components of a telemetry device according to the current invention, the detailed system functional diagram of FIG. 2 will be described, based on the initial telesensor chip configuration depicted in FIG. 1. (Where functional blocks previously cited in FIG. 1 are described, their original reference numbers are retained for greater clarity). At left, the four analog input signals from the two on-chip temperature sensors 110 and 120 and the two external inputs 121 and 122 are routed into the analog multiplexer 130. One 0–3 V analog signal from this group is selected by the two SCHA lines (1,0) from the system Control Logic block 320 to be fed into the 10-bit successive-approximation ADC 140. The serial data stream from the ADC is fed into the register 211, which stacks the data into the desired order of transmission; this raw stream is then differentially encoded into packets according to the desired format in the Encoder block 212 and sent to the downstream Data Spreader block 222 over the DPKT line. Next, the actual selected spread-spectrum code polynomial (as determined from external chip connections decoded in the External Configuration block 340 via the Code Select line) is produced in the PN Symbol Generator 221; its serial output appears at the chipping rate on the PN Code line at the chip input of the Data Spreader 222. This block concatenates the data and chip streams via control gating and a final XOR gate into the final Spread Data Output (SDO) signal, which feeds the modulation port of RF mixer 240. The RF output of the modulating mixer is routed via the Modulated Carrier (MCAR) line to the RF power amplifier 250, and thence to the Antenna 270.

The operation of the PN Symbol Generator 221 is determined by its constituent circuits and the selected external programming parameters. In a preferred embodiment, the PN generator is a dual 6-bit scheme with paired "A" and "B" registers to produce a 63-bit long spreading code. The design is based on the assumption of a repeating code, where the initial code is selected with six independent preset bits for each selection. The polynomial for the "A" side of the PN generator is:

$$f_a(x)=1+x+x^6$$

The preset bits for this side are hard-wired to a logic high, which presets the initialization to the "A" section. The output of the "A" section is known as the "A" maximal-length sequence (AMLS). For the "B" side, the polynomial is:

$$f_b(x)1+x+x^2+x^5+x^6$$

The preset bits for the "B" section can be selected as all logic "highs" or can be set via six external parameters. External connections to the pins on the chip package through 340 are used to define the preset selection and the polarity (1 or 0) of the six external preset bits. The output of the "B" side is known as the "B" maximal-length sequence (BMLS). A composite polynomial known as a Gold code is generated by gating the AMLS and the BMLS signals together through an XOR gate. Also available to the Spread Data Generator 220 is an external code from 340, permitting any one of the four codes (AMLS, BMLS, Gold, or external) to be selected via the Code Select bus line. As previously cited, Data Spreader 222 then combines this code with the sensor data through an XOR gate to produce the final spread data stream sent to the mixer.

It is a fundamental feature of the invention that the operations of all these blocks utilize as a timing reference only the output from a single clock generator or oscillation source such as clock 310. The chip sequencing is orchestrated by the Control Logic circuitry 320, which is designed to synchronously and concurrently control all of the on-chip sensor control, data-acquisition, data-transmission, and power-management operations. The system Clock Generator 310 is capable of accepting an external clock frequency from external clock 330. The internal clock 310 may alternatively be a stand-alone source, although for satisfactory accuracy and stability, the frequency-controlling crystal, SAW (surface acoustic-wave) device, ceramic resonator, or the like is generally an off-chip component. Clock Generator block 310 then provides all of the required clocks for the operation of the telemetry device or ASIC. The various major clock signals required include the system clock (SYSCLK), the phase-detector reference clock used in the RF carrier synthesizer loop that generates the final transmitted RF carrier frequency (PDREF), and the PN clock (PNCLK).

In a prototype of the invention, the external clock 330 was specified to be four times the frequency required for the basic system clock and the PD reference clock. It should be noted that this 4×ratio in the prototype is only typical; this ratio in general is system-dependent and may be any integer or fractional ratio useful in the specific application context. Indeed, all the dividers cited in the prototypical example may in general be of the integral or fractional types. For example, binary division ratios are generally achieved through a cascade of simple toggle ("T") flip-flops; variable or arbitrary integer ratios are typically realized via standard gated or preset up- or down-counters; and fractional ratios are obtained via multiple counters or dual-modulus counters, as are commonly known in the art. (In general, the use of dual-modulus, multiple-modulus, or "fractional-N" counter techniques to achieve fractional ratios is popular due to its simpler hardware but also has the distinct disadvantage that significantly more spurious and/or intermittent spectral components are generated in the output signal as the loop divide indices are repeatedly switched between two or more values). The more classic reference-divider/loop-divider PLL architecture usually generates purer output spectra, with markedly fewer spurii, and is thus preferred for this type of application. A constant divide-by-four stage on the clock 310 input channel provides this ratio and ensures a very stable and symmetrical reference clock. The PD reference clock is chosen to be a ratio of 1024 ($2^{10}$) with the RF carrier frequency. In this particular implementation, this ratio is a selectable power of two; the value of 1024 is based on the desired output RF carrier frequency versus the local reference frequency, obtained from an external crystal-controlled clock frequency of 3.579545 MHz. The associated system and PD reference clocks have a frequency of 0.89488625 MHz and the final RF carrier frequency is then about 916.36 MHz.

The system clock frequency is selectable, as required by the specific implementation. The available division (CDIV) ratios are 1, 2, 4, or 8, which can be digitally selected using external connections to the pins on the chip's package. The PN clock is the same frequency as the system clock, and can be gated on and off as needed for generating the PN code.

The PN clock is used to clock the selected PN during generation thereof. The SP (spreading) clock in the example was divided by 63 (to about 0.014 MHz in this example), as dictated by the receiver system used for demonstrating the prototype chip.

The Control Logic 320 contains a synchronously clocked state machine designed to sequence the chip through the three basic operational modes of the device (data-acquisition, data-transmission, and the quiescent or "sleep" mode). The state machine separates the operation of these modes to ensure appropriate time-isolation of the various internal chip functions and to conserve battery power. For instance, the on-chip sensors and analog front-end components will experience significant interference from RF pickup when transmitting, so the essential scheme is to operate the sensors and ADC with all RF stages off. Once the data is converted and latched in on-chip registers, the spread-spectrum code generator and RF synthesizer stages can be energized. After a few milliseconds' delay to permit the internal control loop in the Frequency Synthesizer 230 to stabilize, the RF transmitter stages 240,250 are enabled (powered up) and transmission commences. It is vital for low average chip power consumption (typically 1.1 mW for an 8-second transmission interval) that the RF stages only be turned on when absolutely necessary, since they possess by far the biggest current drains (>30 mA) in the system.

The Frequency Synthesizer block 230 contains the three basic elements of a standard phase-locked loop (PLL): (1) a voltage-controlled oscillator (VCO) 231, which operates at the final RF carrier frequency of 916.36 MHz as a super-speed gate-type ring oscillator; (2) a frequency-divider stage 232, which divides down the carrier by the factor of 1024 via a chain of ten special high-speed binary "T" flip-flops to the phase-comparison frequency of 0.89488625 MHz; and (3) the Phase Detector 233, which compares the PDREF signal from the clock 310 with the divided-down carrier in a fast but existing-art phase-frequency detector logic circuit. A downstream low-pass loop filter smooths the DC error signal at the phase-detector output, which in turn is fed back to adjust the VCO frequency until the PLL is locked with essentially zero error.

Figure 3:
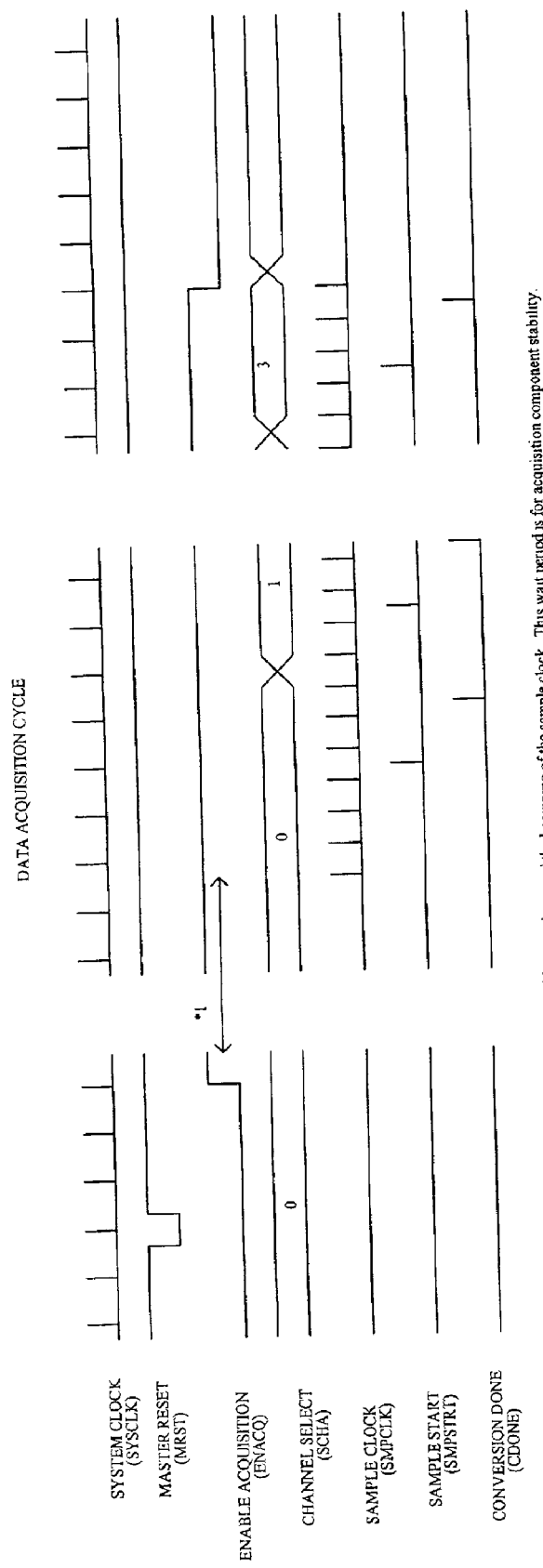
FIG. 3 shows a system data-acquisition timing diagram.
Figure 4:
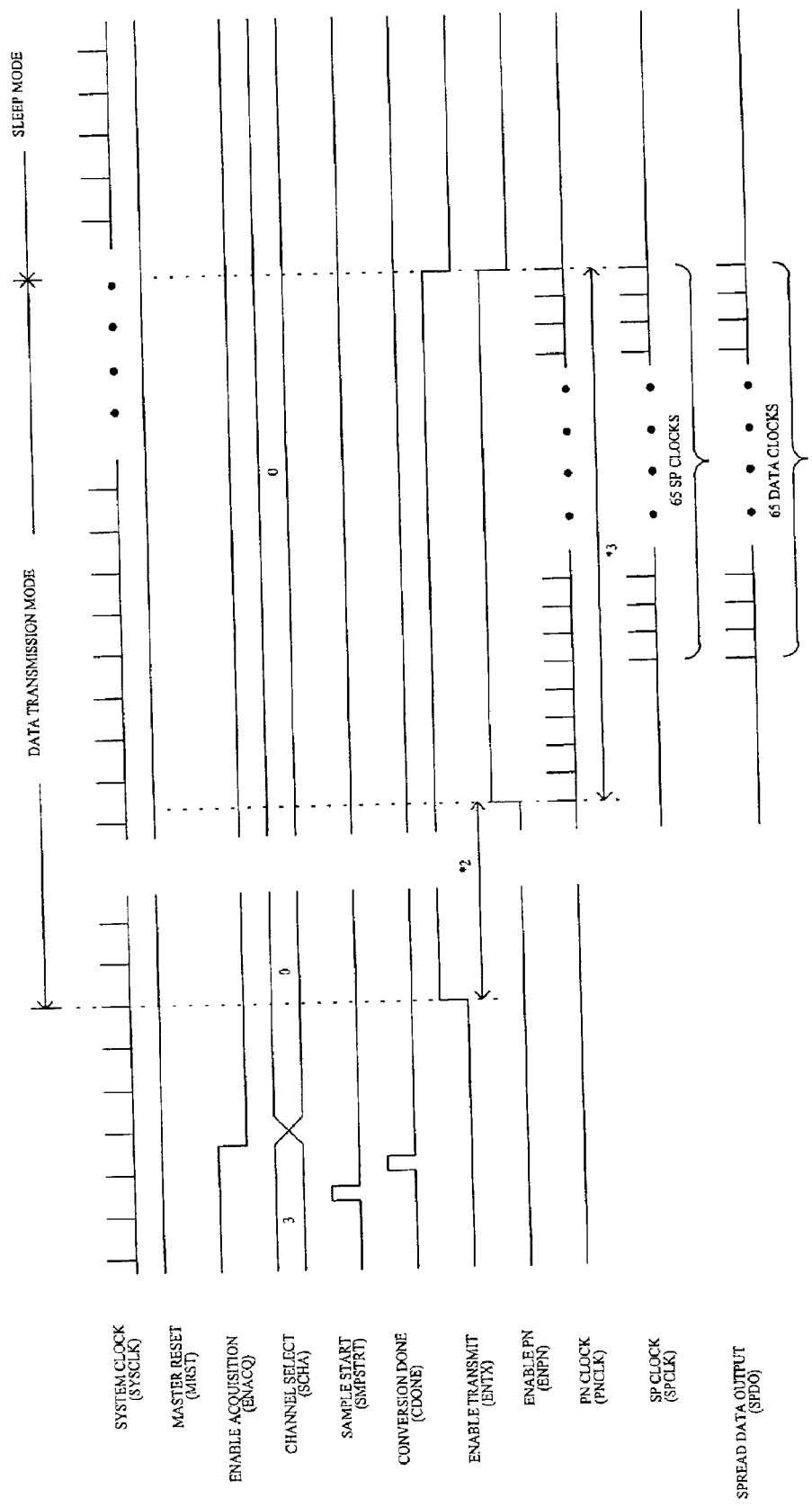
FIG. 4 shows a system data-transmission mode timing diagram.
Figure 5:
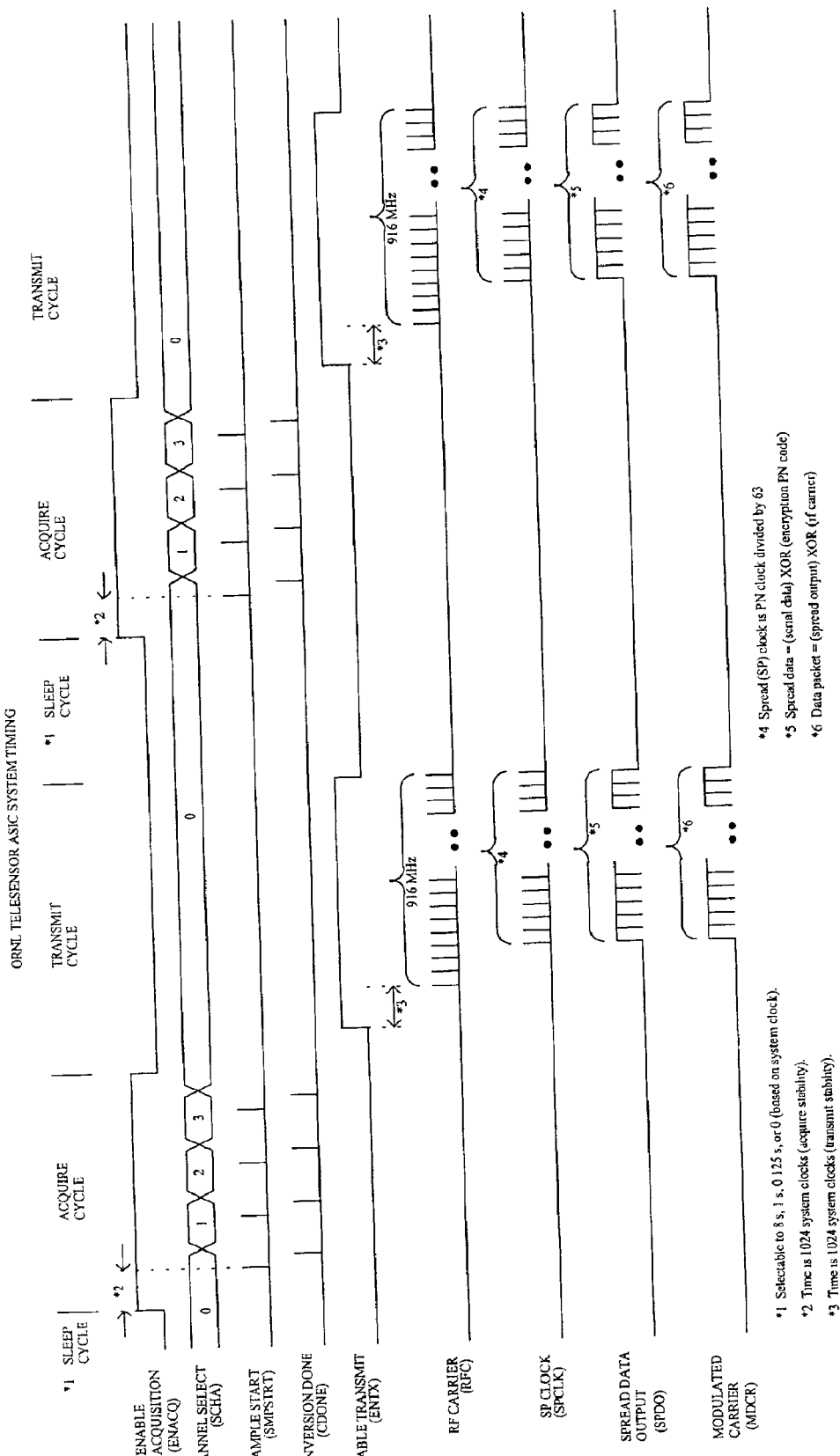
FIG. 5 provides the overall telesensor chip timing scheme, including details of the time relationships between the system data-acquisition, data-transmission, and sleep modes.

The timing diagrams of FIGS. 3-5 provide additional details of the internal chip functional sequences and the key corresponding control signals. The data-acquisition mode shown in FIG. 3 is designed to collect data from the four sensor channels, two from the resident sensors 110, 120 and two from the optional sensor(s) 121,122. In the data-acquisition mode, the state machine enables power to the sensors and related components with a logic "high" sent to the enable acquisition (ENACQ) signal. (A component or circuit block is logically enabled only after it has been supplied the power necessary to perform its intended function). After assertion of the ENACQ signal, the state machine implements a setup delay by counting a selected number of system clock cycles (e.g., 1024) to assure internal device circuit stability before beginning the actual data-acquisition sequence. The data-acquisition sequence begins by setting analog multiplexer 130 to channel 0 of the four channels SCHA designated 0–3 (two bits, with one state for each sensor input). Data acquisition is controlled through ADC 140 by the control state machine logic 320, which provides a sample clock (SMPCLK) and a sample-start signal (SMPSTRT) to the converter. When ADC 140 has completed the conversion of the data on channel 0, it returns a sample conversion-done signal (CDONE) to the controller 320. The state machine then asserts a write strobe SERMD to load the parallel ADC data into Register 211. Thereafter, this cycle is repeated for channels 1, 2, and 3. This completes the data-acquisition cycle—the enable-acquisition signal is then switched to a logic "low", removing power from the sensors and related components.

The state machine 320 now selects the data-transmission mode by enabling power to the appropriate transmission components; the associated timing sequence is shown in FIG. 4. Again, a wait time of 1024 system clock cycles is generally used to allow the devices to stabilize and the RF carrier generator to settle before data transmission is started. A parallel-to-serial converter (not shown) which is an integral part of Packet Engine 210 is enabled to convert the parallel digital sensor data in Register 211 to a serial stream, and the PN clock PNCLK is enabled to generate the PN code at PN generator 210. Serial data is shifted through a standard differential encoder 212 to form the appropriately formatted sensor data packet DPKT. The format provided by encoder 212 is:

$$\text{out}(k)=[\text{out}(k-1)]\oplus[\text{in}(k)]$$

where $\oplus$ denotes the operation of an exclusive-OR gate. The differential encoding format is commonly employed in digital communications links to assist in the synchronization of remote receivers to the data stream and to overcome the 180° phase (sign) ambiguity inherently present in noncoherent (non-phase-synchronous) phase-shift keyed (PSK) links, whether wired, wireless, or optical in nature. The differential technique permits easy extraction of a data clock component from the encoded bitstream, in exchange for a modest (~1-dB) performance penalty compared with fully synchronous links. The transmitted data packet consists of a serial bitstream which contains an initial preamble bit, a preamble word, a unit identification (ID) word, and four sensor-data words. The complete data packet is composed of 6 data words of 10 bits each. The sensor data packet and the PN code are then combined into a SP generator data set by operation of SP data generator 220. The operation involves gating the sensor data packet and the PN code through an exclusive-OR (XOR) gate. The resulting spread-data burst typically has 63 spread-bits ("chips") per data bit. After multiplying the 63-chip PN spreading sequence, the total spread data packet contains 3780 chips.

Onboard the chip, the state machine measures the 65-bit data stream length by counting 65 SP clock pulses. When the state machine has finished counting the 65 SP clock pulses, signifying completion of the data transmission, the logic "high" signals which enabled the PN generator and other components are lowered and the state machine enters a "sleep" mode. This mode is a battery-conservation mode, the only activity being the state machine's counting of the system clock pulses to determine the end of the sleep mode. The sleep-mode length is determined by parameters from external input pins, and can be set to either 8, 1, 0.14, or 0 seconds. After completion of the sleep time, the state machine enters the data-acquisition mode to begin the overall cycle again. The overall relationship between the data-acquisition and data-transmission timing cycles, plus the sleep intervals, is shown in the ASIC System Timing diagram of FIG. 5.

Figure 6:
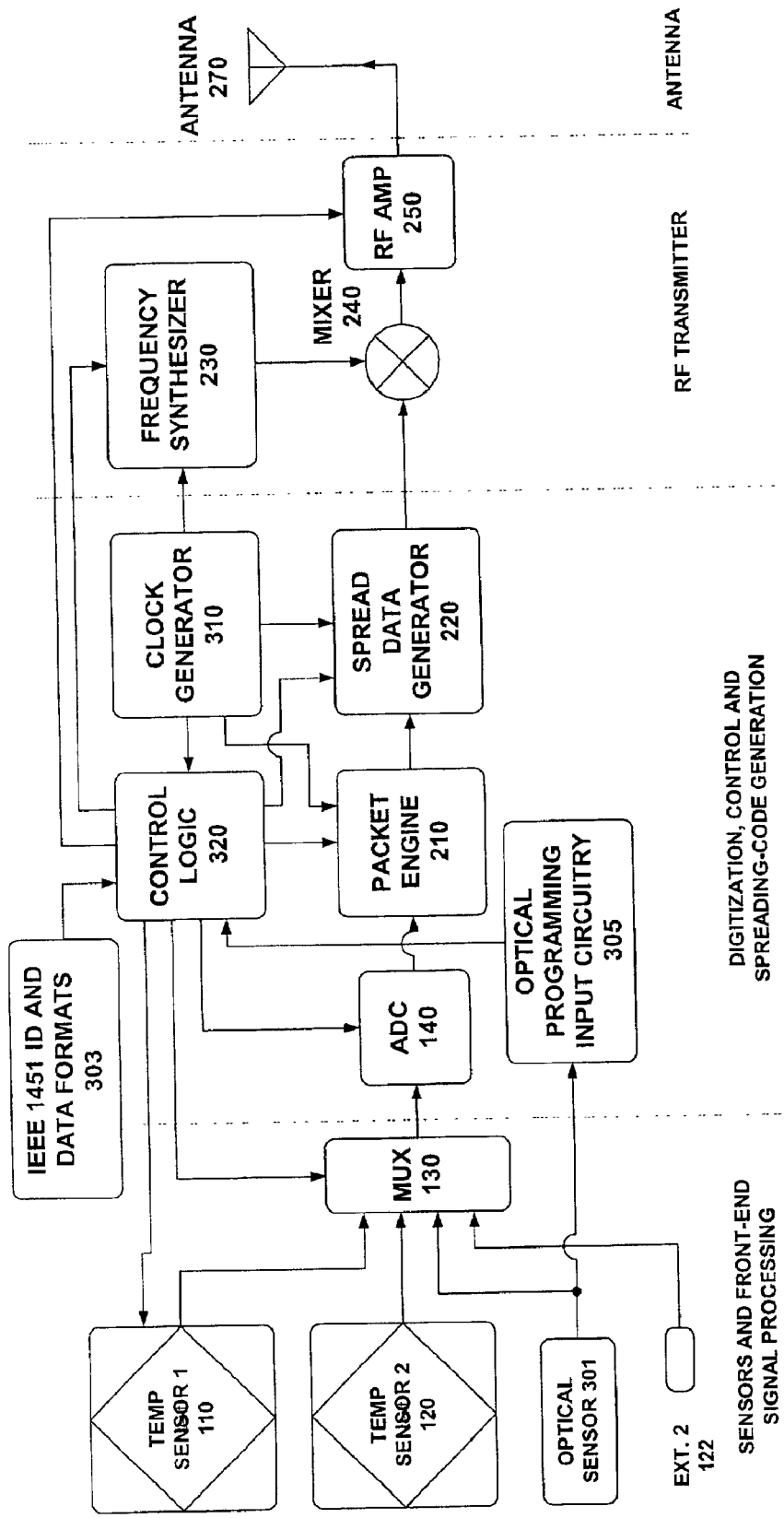
FIG. 6 shows a block diagram of a second embodiment of the invention.

FIG. 6 shows a block diagram of a second version of the telesensor ASIC. Although obviously similar to the original version depicted in FIG. 1, this device incorporates an additional on-chip optical sensor 301; a single external signal 122 is also accessible. An auxiliary optical receiver system (phototransistor or photodiode devices) detects an incoming gated (on/off) infrared control beam, extracts its standard commercial-format (TV remote-control) serial bitstream, and repackages the data into the specific form expected by the on-chip controller logic. Functionally, this interface is shown as the "Optical Programming Input Circuitry" block 305. An additional feature of this second-version ASIC is the inclusion of special logic 303 to provide data formatting and device identification information in accordance with the industry-standard IEEE 1451 "Smart Transducer" family of protocols.

Figure 7:
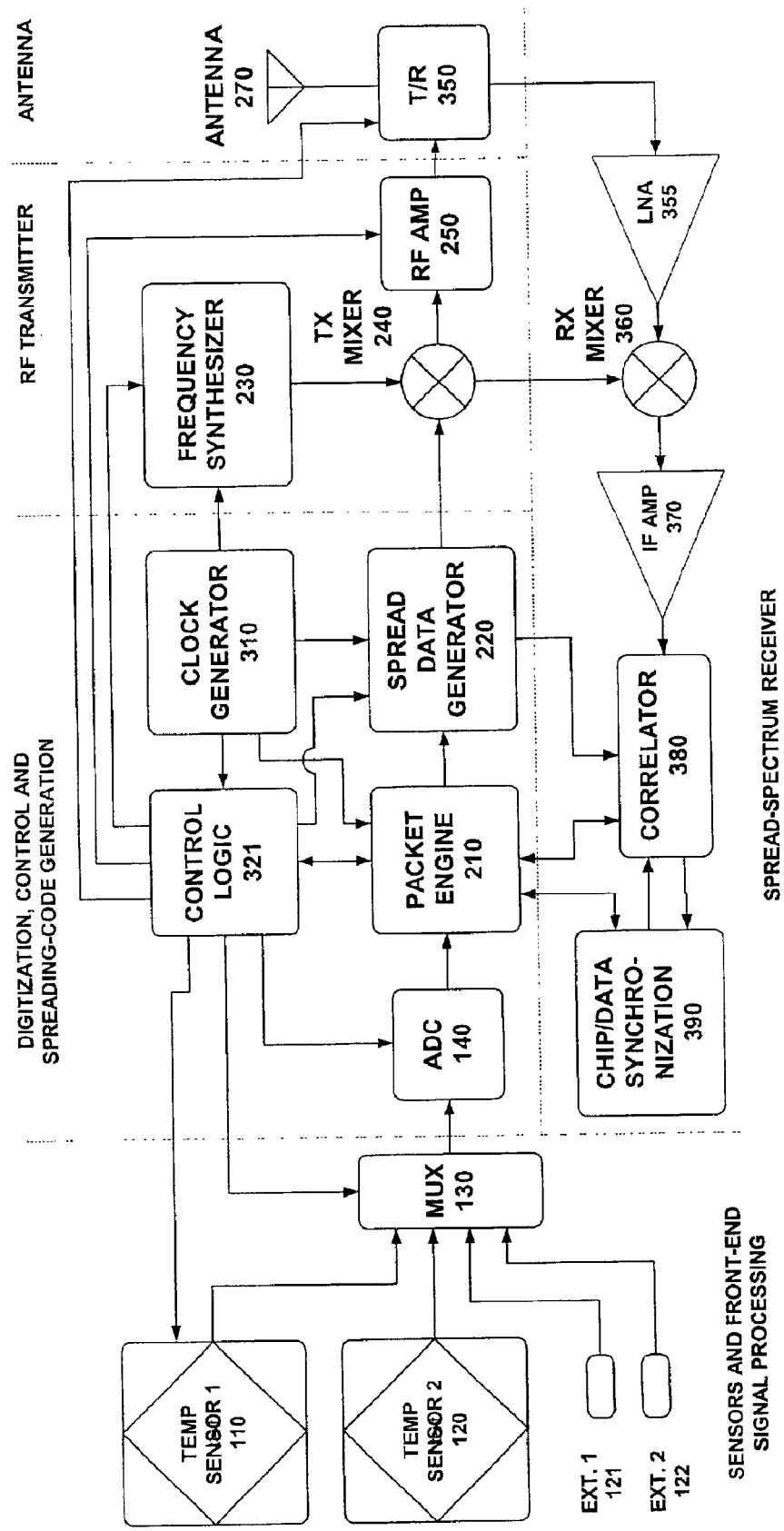
FIG. 7 shows a block diagram of a third embodiment of the invention including both standard and hybrid spread-spectum RF transmission capabilities.

The block diagram of an RF receiver implementation of the telesensor device is shown in FIG. 7, where the receiver circuitry is configured to operate only during intervals when the transmitter is "off"; for similar reasons, the receiver (and especially its local RF oscillator) would also in general be inactivated during sensor and front-end data-acquisition operations. The various functional blocks include: a front-end transmit/receive switch (T/R) 350 connected to the antenna; an input low-noise amplifier (LNA) 355 to boost the received-signal amplitude; a downconverting RF mixer 360; an intermediate-frequency (IF) amplifier 370; a demodulator/spread-spectrum correlator 380 to extract the incoming remote-control data; and the required circuits 390 to perform local synchronization to the received chipping and data signals. The "Control & Data Logic" box 321 is modified from the earlier transmit-only implementation box 320 to handle the additional tasks of manipulating the control data from the RF receiver and controlling the operation of the receiving circuitry (e.g., sequencing, power switching).

Figure 8:
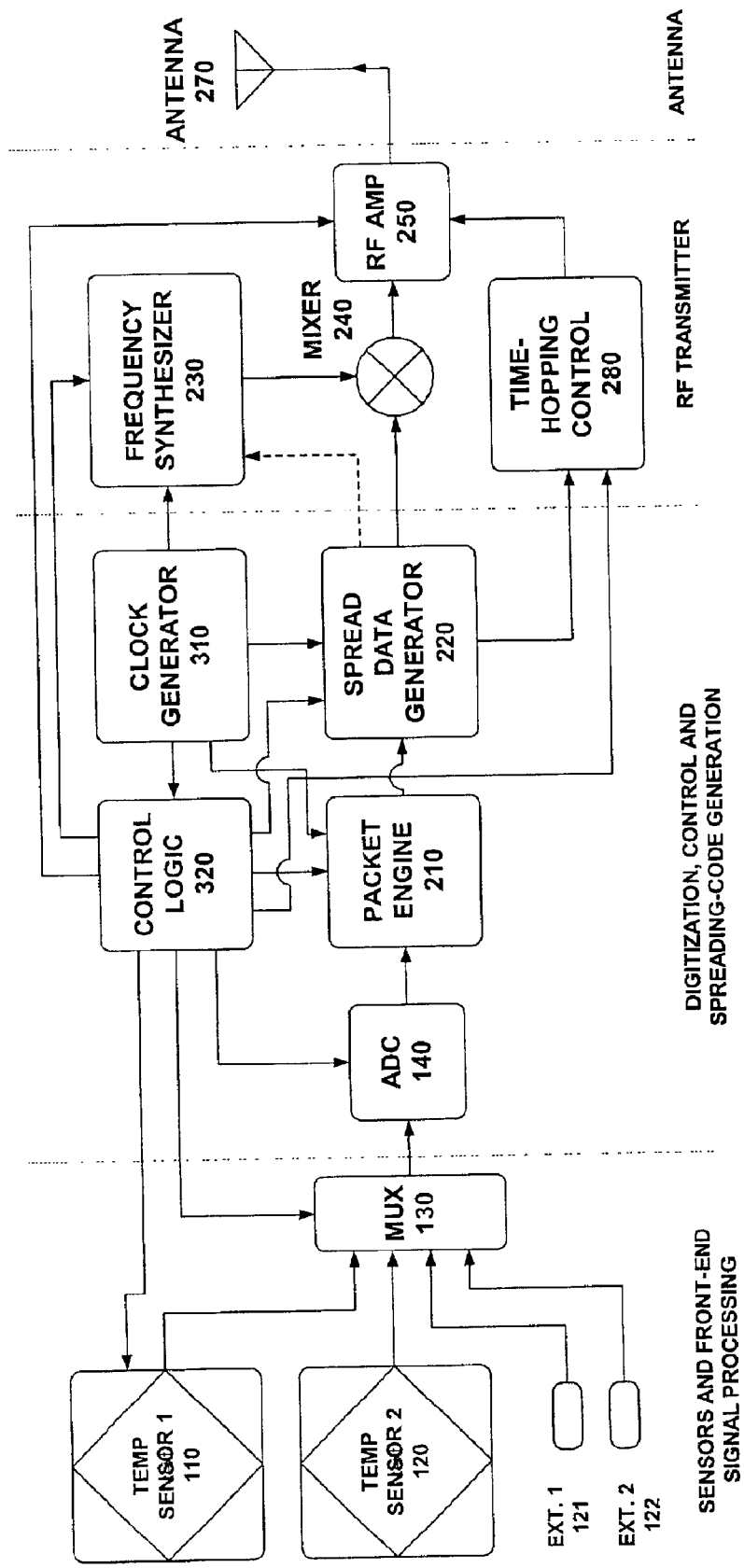
FIG. 8 shows a block diagram of a fourth embodiment of the invention including both RF transmission and reception capabilities.

FIG. 8 provides a block diagram of an alternative version of the basic device depicted in FIG. 1; for purposes of consistency, the numbering scheme from the original figure is retained. A common alternative to the direct-sequence spread-spectrum transmission technique, termed "frequency hopping", may be implemented by sending a polynomial code from block 220 to control the frequency synthesizer 230 (designated by the dashed line in the drawing) in order to generate a random string of transmission frequencies from the system, where a simple (non-spread) data stream from 220 is used to modulate the RF carrier in mixer 240. If the data stream from 220 is also spread, as in the basic device of FIG. 1, the final transmission will be both direct-sequence and frequency-hopping modulated and is termed a "hybrid spread-spectrum" signal. Another form of spread-spectrum modulation involves the addition of a randomized time-gating (on/off) function the standard modulation process, to achieve "time-hopping" spread-spectrum modulation. In FIG. 8, the circuitry to implement this function is contained in block 280, which receives the random-code information from the Spread Data Generator 220, selects a subset of the code therefrom, and develops the final desired time-gating signal, which turns on the final RF transmitter output for the desired (pseudo) random intervals. The finer details of this logic scheme are straightforward and are readily available, for example, in the popular text by Robert C. Dixon, *Spread Spectrum Systems with Commercial Applications, 3rd Edition*, John Wiley and Sons, Inc., 1994, pp. 55–58. A combination of this time-hopping technique with either direct-sequence, frequency-hopping, or a combination of those two, is yet another hybrid spread-spectrum modulation format, which is of particular use in difficult RF environments which suffer from significant multipath, interference, and other degradations.

Figure 9:
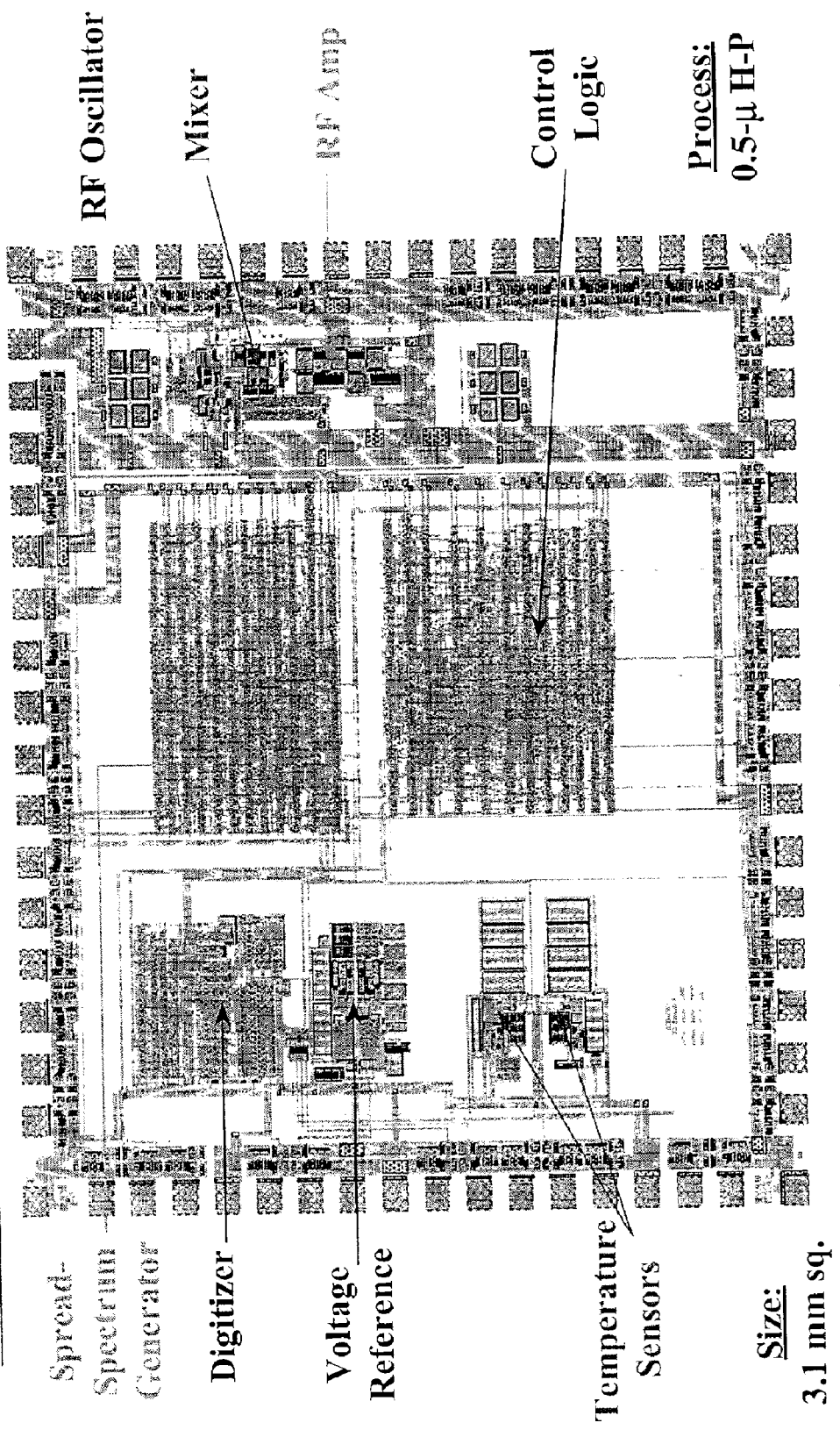
FIG. 9 is a representation of a basic monolithic wireless telesensor chip according to the invention.

FIG. 9 provides a representational layout view of the prototype telesensor chip described in FIG. 1; the various circuit blocks are self-evident, except that the "Digitizer" and "Voltage Reference" circuits are both constituent parts of the ADC. The "RF Oscillator" at upper right represents the VCO stage cited previously; the Divider and Phase Detector blocks within the Frequency Synthesizer block 230 are unlabeled but lie immediately adjacent to the VCO.

Figure 10:
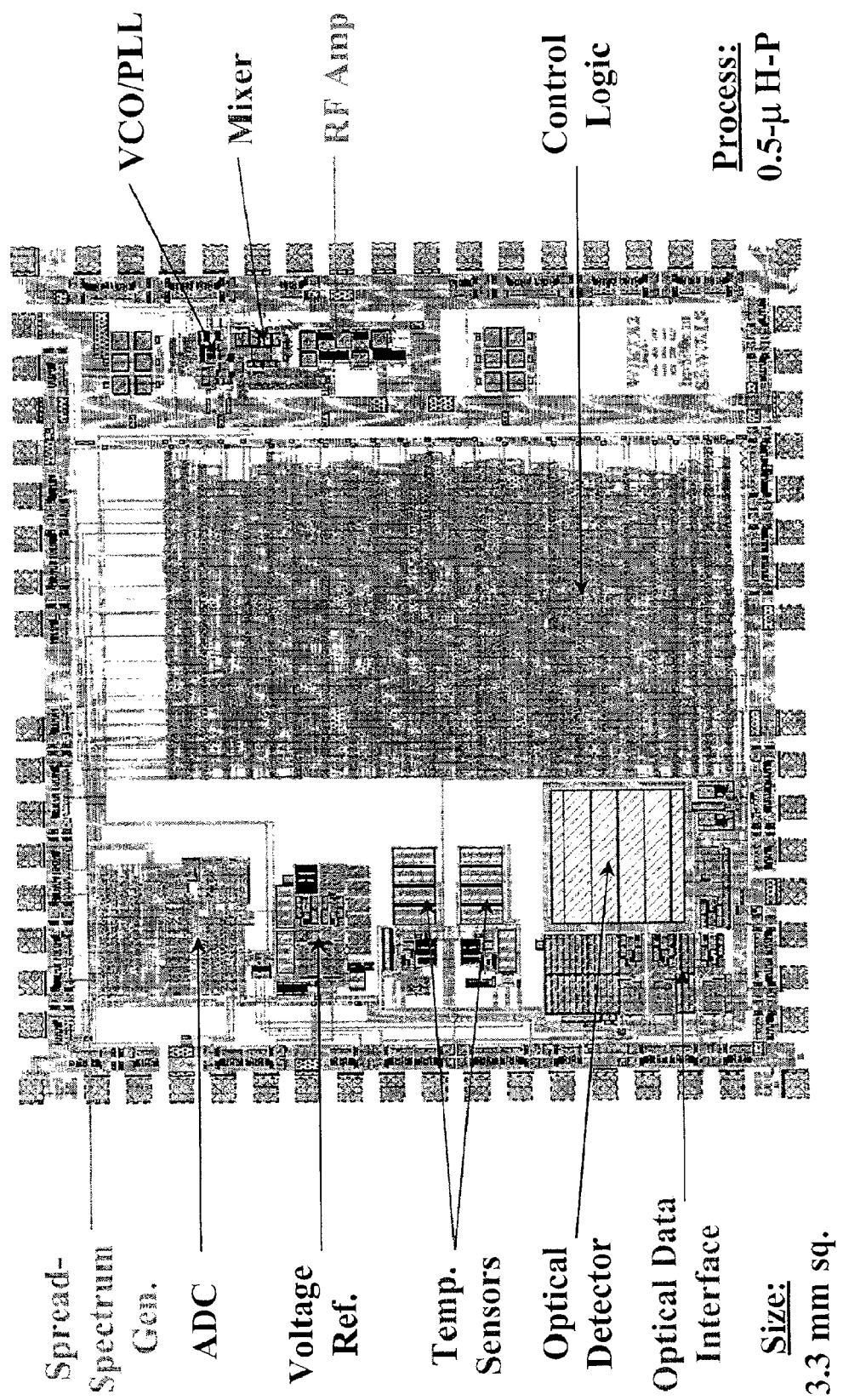
FIG. 10 is a representation of a second version of the monolithic wireless telesensor chip with an added optical sensor and optical data-interface circuitry according to the invention.

Similarly, FIG. 10 is a corresponding view of the second-generation prototype ASIC device, with the Optical Data Interface 305 and the Optical Detector (Sensor) 301 at the lower left corner of the die. The special IEEE 1451 logic block 303 is located within the large logic array near the center of the chip.

Industrial Utility

By switching power between the separate components, the present invention also gains the advantage of heat management. For example, a data acquisition telemetry device designed to measure temperature may have its readings skewed when the chip temperatures vary from the ambient temperature of the environment. When the transmitter is transmitting it produces heat, which raises the temperature of the chip. By having the transmitter enabled only intermittently, the total amount of heat generated is reduced and the resulting on-chip circuit temperature drift is also reduced. If further, the transmission times are known and regular, the heat produced by the active transmitter can be predicted. Using this information, the probable temperature increase of the chip can thus be determined and the data adjusted accordingly to be more accurate.

The current invention has the ability to deterministically define all of the system functions. It provides a host of other benefits such as: simpler, lower-power logic design; smaller chip area; and lower fabrication costs. While providing these advantages, the invention also improves the operations of the simpler, less expensive device by providing lower system noise levels including circuit- and substrate-coupled effects and characteristics such as improved tolerance to clock asymmetries, propagation-delay variations, supply and temperature changes, and other known idiosyncratic and idiopathic digital errors in critical signal, control, and RF lines. Further, the fully synchronous architecture of the chip also greatly facilitates the addition of complementary RF or optical receiving circuits, which in turn may be controlled by the onboard state-machine logic.

An improved transmitter architecture enables simplified receiver system hardware (either on-chip or external), reduction in the receiver's acquisition and lockup times, higher reliability in data-burst acquisition (particularly in noisy receiving conditions), and facilitation of a more robust receiver synchronization methodology. The instant invention as shown in FIG. 10 has application not only in the ASIC referred to herein in exemplary fashion, but also to chips or elements used in PLA (programmable logic array), PLD (programmable logic device), FPGA (field-programmable gate array), and other standard multi-gate logic devices. This fully synchronous architecture, or discrete units utilizing such architecture, clearly can also be implemented in multiple-device configurations such as board-level designs.

Many of the components utilized in the invention and discussed above, as well as some of the operations executed thereby, are well known to those of skill in the art. Moreover, methods of coupling the devices and manipulating the various control systems are also known. Therefore, there are a multitude of variations in operation and components which can exist, without departing from the spirit and scope of this invention. That spirit and scope are to measured in light of the following claims.

What is claimed is:

1. A telemetry apparatus comprising:
a monolithic substrate;
data acquisition means carried on said substrate for acquiring data;
a transmitter carried on said substrate and in operable connection with said data acquisition means;
controller means carried on said substrate and in operable connection with said transmitter for selectively enabling said transmitting at selected times; and
a clock generator carried on said substrate operably connected to said data acquisition means and said tramitter and said controller means.

2. The apparatus as recited in claim 1, wherein said clock generator is connected to a single oscillation source.

3. The apparatus as recited in claim 1, further comprising data processing means carried on said substrate operably connected between said data acquisition means and said transmitter for processing said data.

4. The apparatus as recited in claim 1, wherein said clock generator transmits a first frequency to said data acquisition means, transmits a second frequency to said transmitter, and transmits third frequency to said controller means wherein said first, second, and third frequencies are rational multiples of a selected frequency.

5. The apparatus as recited in claim 4, further consisting of a single oscillation source for providing the selected frequency.

6. The apparatus as recited in claim 1, further comprising sensor means in electrical communication with said data acquisition means for detecting ambient attributes in proximity to said monolithic substrate.

7. The apparatus as recited in claim 6, wherein said sensor means is selected from the group consisting of a temperature sensor, an optical sensor, a flow sensor, a humidity sensor, a chemical sensor, a biochemical sensor, a current sensor, a voltage sensor, a magnetic field sensor, an electric field sensor, a vibration sensor, and acoustic sensor, a radiation sensor, a charge sensor, a viscosity sensor, a density sensor, an electrical resistance sensor, an electrical impedance sensor, an electrical capacitance sensor, an electrical inductance sensor and a pressure sensor.

8. The apparatus as recited in claim 1, further comprising programming means for programming the times that said controller enables said transmitter.

9. The apparatus as recited in claim 8, wherein said programming means programs said controller using an optical bitstream.

10. The apparatus as recited in claim 8, wherein said programming means programs said controller using RF communications.

11. The apparatus as recited in claim 8, wherein said programming means programs said controller using RF communications.

12. The apparatus as recited in claim 1, wherein said controller means selectively enables said data acquisition means and at selected times.

13. The apparatus as recited in claim 12, wherein said controller means sequentially enables said data acquisition means and said transmitter.

14. The apparatus as recited in claim 12, further comprising programming means for programming the times that said controller enables said data acquisition means.

15. The apparatus as recited in claim 12, further comprising programming means for programming the times that said controller enables said data acquisition means.

16. The apparatus as recited in claim 15, wherein said programming means programs said controller using an optical bitstream.

17. A telemetry apparatus comprising:
a monolithic substrate;
data acquisition means carried on said substrate for acquiring data;
a transmitter carried on said substrate and in operable connection with said data acquisition means;
controller means carried on said substrate and in operable connection with said transmitter for selectively enabling said transmitter and said data acquisition means at selected times; and
a clock generator carried on said substrate operably connected to said data acquisition means and said transmitter, wherein said clock generator is operably connected to a single oscillation source.

18. The apparatus as recited in claim 17, further comprising data processing means carried on said substrate operably connected between said data acquisition means and said transmitter for conditioning said data.

19. The apparatus as recited in claim 17, further comprising sensor means in electrical communication with said data acquisition means for detecting ambient attributes in proximity to said monolithic substrate.

20. The apparatus as recited in claim 19, wherein said sensor means is selected from the group consisting of a temperature sensor, an optical sensor, a flow sensor, a humidity sensor, a chemical sensor, a biochemical sensor, a current sensor, a voltage sensor, a magnetic field sensor, an electric field sensor, a force sensor, an acceleration sensor, a velocity sensor, a displacement sensor, a position sensor, a vibration sensor, an acoustic sensor, a radiation sensor, a charge sensor, a viscosity sensor, a density sensor, an electrical resistance sensor, an electrical impedance sensor, an electrical capacitance sensor, an electrical inductance sensor and a pressure sensor.

21. The apparatus as recited in claim 17, wherein said clock generator transmits a first frequency to said data acquisition means, transmits a second frequency to said transmitter, and transmits a third frequency to said controller means, wherein said first frequency, said second frequency, and said third frequency are multiples of a selected frequency.

22. The apparatus as recited in claim 21, wherein said first frequency, said second frequency, and said third frequency are rational multiples of the selected frequency.

23. The apparatus as recited in claim 21, further consisting of a single oscillation source for providing the selected frequency.

24. The apparatus as recited in claim 21, wherein said clock generator provides a plurality of oscillation signals, each of said oscillation signals being a selected rational multiple of the oscillation signal from said oscillation source.

25. A telemetry apparatus comprising:
a monolithic substrate;
data acquisition means carried on said substrate for acquiring data;
a transmitter carried on said substrate and in operable connection with said data acquisition means;
controller means carried on said substrate and in operable connection with said transmitter for selectively enabling said transmitter at selected times;
receiver means carried on said substrate and in operable connection with said controller means for receiving signals;
a clock generator means carried on said substrate operably connected to said data acquisition means, said transmitter, said receiver means and said controller means.

26. The apparatus as recited in claim 25, wherein said clock generator is connected to a single oscillation source.

27. The apparatus as recited in claim 25, wherein said clock generator transmits a first frequency to said data acquisition means, transmits a second frequency to said transmitter, transmits a third frequency to said controller means and transmits a fourth frequency to said receiver means, wherein said first, second, third and fourth frequencies are rational multiples of a selected frequency.

28. The apparatus as recited in claim 25, further consisting of a single oscillation source for providing the selected frequency.

29. The apparatus as recited in claim 25, further comprising data processing means carried on said substrate operably connected between said data acquisition means and said transmitter for processing said data.

30. The apparatus as recited in claim 25, wherein said controller means selectively enabling said receiver at selected times.

31. The apparatus as recited in claim 25, wherein said controller means selectively enabling said sensor at selected times.

32. The apparatus as recited in claim 25, wherein said transmits a digital signal.

33. The apparatus as recited in claim 25, wherein said transmitter transmits a spread spectrum signal.

34. The apparatus as recited in claim 25, wherein said transmitter transmits a direct-sequence spread spectrum signal.

35. The apparatus as recited in claim 25, wherein said transmitter transmits a frequency hopping spread spectrum signal.

36. The apparatus as recited in claim 25, wherein said transmitter transmits a time hopping spread spectrum signal.

37. The apparatus as recited in claim 25, wherein said transmitter transmits a combination of one or more of direct-sequence, frequency hopping, and time-hopping spread spectrum signals.

38. The apparatus as recited in claim 25, further comprising sensor means in electrical communication with said data acquisition means for detecting ambient attributes in proximity to said monolithic substrate.

39. The apparatus as recited in claim 38, wherein said sensor means is selected from the group consisting of a temperature sensor, and optical sensor, a flow sensor, a humidity sensor, a chemical sensor, a biochemical sensor, a current sensor, a voltage sensor, a magnetic field sensor, an electric field sensor, a force sensor, an acceleration sensor, a velocity sensor, a displacement sensor, a position sensor, a vibration sensor, an acoustic sensor, a radiation sensor, a charge sensor, a viscosity sensor, a density sensor, an electrical resistance sensor, an electrical impedance sensor, an electrical capacitance sensor, an electrical inductance sensor and a pressure sensor.

40. The apparatus as recited in claim 25, wherein said controller means selectively enables said data acquisition means at selected times.

41. The apparatus as recited in claim 40, wherein said controller means sequentially enables said data acquisition means and said transmitter.

42. The apparatus as recited in claim 40, further comprising programming means for programming the times that said controller enables said data acquisition means.

43. The apparatus as recited in claim 42, wherein said programming means programs said controller using an optical bitstream.

44. The apparatus as recited in claim 40, further comprising programming means for programming the times that said controller enables said transmitter.

45. The apparatus as recited in claim 44, wherein said programming means is in operable connection with said receiver means for programming said controller using an signal received by said receiver means.

46. The apparatus as recited in claim 45, wherein said signal is selected from the group consisting of optical bitstream and RF signal.

47. The apparatus as recited in claim 46, wherein said programming means programs said controller using RF communication.

48. A method for synchronous telemetry comprising:
- a clock generator feeding a signal simultaneously to
- a controller means;
- a frequency synthesizer; and
- a spread data generator said controller means activating in order
- at least one sensor
- at least one multiplexer means
- at least one analog to digital converter,
- at least one frequency synthesizer, and
- at least one radio frequency transmitter wherein each of said sensor, multiplexer, analog to digital converter, said frequency synthesizer and said transmitter are activated in sequence so as to utilize only so much power as is required to process and transmit information from said at least one sensor to a receiver.

49. A method for synchronous telemetry according to claim 48 further comprising means to program said controller means using a signal from a receiver means.

50. A method for synchronous telemetry according to claim 49 wherein said signal is selected from the group consisting of an optical bitstream and an RF signal.

51. A method to regulate power drain in synchronous telemetry apparatus having components comprising:
- at least one sensor;
- at least one multiplexer means;
- at least one analog to digital converter;
- at least one synthesizer and
- at least one radio frequency transmitter;

said means comprising a controller means which activates each component in a programmed order and deactivates each component in a programmed order whereby power is provided only to components needed to perform a specific function.

52. A method for synchronous telemetry comprising:
- a clock generator feeding a signal simultaneously to
- a controller means;
- a frequency synthesizer; and
- a spread data generator said controller means activating in order
- at least one sensor
- at least one multiplexer means
- at least one analog to digital converter,
- at least one frequency synthesizer and
- at least one radio frequency transmitter wherein each of said sensor, multiplexer, analog to digital converter, said frequency synthesizer and said transmitter are activated in sequence so as to minimize the potential for interference from said radio frequency transmitter to other said stages while processing and transmitting information from said at least one sensor to a receiver.

53. A method for synchronous telemetry according to claim 52 further comprising means to program said controller means using a signal from a receiver means.

54. A method for synchronous telemetry according to claim 53 wherein said signal is selected from the group consisting of an optical bitstream and an RF signal.

55. A method to minimize radio frequency self-interference in synchronous telemetry apparatus having components comprising:
- at least one sensor;
- at least one multiplexer means;
- at least one analog to digital converter;
- at least one synthesizer and
- at least one radio frequency transmitter means;

said means comprising a controller means which activates each component in a programmed order and deactivates each component in a programmed order whereby power is provided only to components needed to perform a specific function and whereby radio frequency interference from said transmitter means to order components is minimized.

56. A method to minimize radio frequency self-interference in synchronous telemetry apparatus having components comprising:
- at least one sensor;
- at least one multiplexer means;
- at least one analog to digital converter;
- at least one synthesizer and
- at least radio frequency transmitter means;

said means comprising a controller means which activates each component in a programmed order and deactivates each component in a programmed order whereby power is provided only to components needed to perform a specific function and there is no overlap in active operation between said radio frequency transmitter means and any other operation on the apparatus.

* * * * *

UNITED STATES PATENT AND TRADEMARK OFFICE
CERTIFICATE OF CORRECTION

PATENT NO. : 6,864,802 B2
DATED : March 8, 2005
INVENTOR(S) : Stephen F. Smith et al.

It is certified that error appears in the above-identified patent and that said Letters Patent is hereby corrected as shown below:

Column 16,
Line 13, replace "tramitter" with -- transmitter --.

Signed and Sealed this

Sixteenth Day of August, 2005

JON W. DUDAS
*Director of the United States Patent and Trademark Office*